United States Patent [19]

Weichenrieder

[11] Patent Number: 4,610,399
[45] Date of Patent: Sep. 9, 1986

[54] MIXING PARTICULATE MATERIALS

[75] Inventor: Erich Weichenrieder, Egling-Neukolbing, Fed. Rep. of Germany

[73] Assignee: Recycloplast AG, Egling-Neukolbing, Fed. Rep. of Germany

[21] Appl. No.: 692,116

[22] Filed: Jan. 17, 1985

[30] Foreign Application Priority Data

Jan. 19, 1984 [DE] Fed. Rep. of Germany ....... 3401758
Jan. 19, 1984 [DE] Fed. Rep. of Germany ....... 3401774
Jan. 19, 1984 [DE] Fed. Rep. of Germany ....... 3401789

[51] Int. Cl.⁴ .............................................. B02C 4/00
[52] U.S. Cl. ................................ 241/101 B; 222/272; 222/312; 366/160; 366/177; 366/182
[58] Field of Search ............... 222/272, 290, 291, 312, 222/328, 345; 366/8, 14, 71, 72, 73, 74, 76, 133, 147, 148, 152, 155, 160, 162, 181, 182, 186, 154, 177; 241/101 B

[56] References Cited

U.S. PATENT DOCUMENTS

| | | | |
|---|---|---|---|
| 7,926 | 10/1877 | Winchell | 222/312 |
| 900,790 | 10/1908 | Smith | 222/312 |
| 2,073,567 | 3/1937 | Sciarra | 366/76 |
| 2,478,885 | 8/1949 | Alvey | 366/71 |
| 2,764,779 | 10/1956 | Zona | 366/152 |
| 3,147,514 | 9/1964 | Reilly | 366/71 |
| 3,353,798 | 11/1967 | Draper | 366/8 |
| 3,933,086 | 1/1976 | Standing | 222/272 |
| 4,322,167 | 3/1982 | Hill | 366/14 |
| 4,443,110 | 4/1984 | Otter | 366/147 |

Primary Examiner—Timothy F. Simone
Attorney, Agent, or Firm—Harness, Dickey & Pierce

[57] ABSTRACT

The invention relates to the mixing of particulate materials with a given mixing ratio and as part of a plant and process requiring the materials, comprising the steps of metering the materials separately in respective metering units running at least substantially continuously, permitting the materials to fall freely onto a horizontal conveyor belt with a planar surface with a distribution of the materials over the belt, and supplying the materials in a further free fall to a further processing zone as part of the process.

23 Claims, 10 Drawing Figures

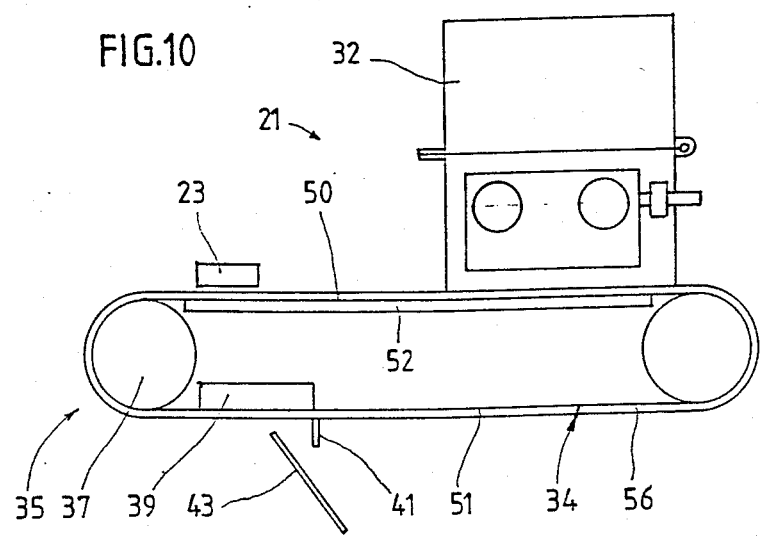

MIXING PARTICULATE MATERIALS

BACKGROUND OF THE INVENTION

The invention relates to the mixing of particulate materials and more particularly but not exclusively to a method of mixing particulate materials with a given mixing ratio as part of a process requiring such materials and to an apparatus for performing the method. As used herein the term "particulate" does not limit the particles in the materials to any specific size or range but is merely to distinguish the materials from fluids or solid masses in one piece.

Difficulties are likely to be experienced in connection with the mixing of particulate materials having different specific gravities and/or different forms of the particles to get a given mixing ratio more particularly in those cases in which the paramount objective is not to produce an overall mixture containing given proportions of the individual components but rather to make certain that the distribution of the components in the mixture is as even as possible so that even if some fractions are relatively small the desired mixing ratio is in fact adhered to and/or if the mixing operation is to take place in a more or less continuous process. Even if it proves feasible to supply the amounts of the starting materials in the desired mixing ratio at least substantially continuously to a given position, there is bound to be a certain distance between the metering units supplying the different components of the mixture, or between the outlets of the units, so that the starting components will be separated from each other in space accordingly. It is not in fact possible for the components separated in this way to be supplied at one point by using a sort of hopper device because the components with their different specific gravities and other different properties may well adhere to a different extent and more specially in an uncontrolled manner to the wall faces or baffles of such apparatus so that there will be fluctuations in the mixing ratio. Mechanical mixing devices such as mixing drums, agitators, or the like also prove unsuccessful because with such differing properties of the components they are not able to mix the components evenly; a further telling point is that the transport from the mixing plant to the processing zone is likely to cause a further uncontrolled change in the mixing ratio.

In order to make the position clearer, the aim of the invention will now be elucidated on the basis of a practical example without this however limiting its field of application.

Synthetic resin components, now specially in the form of comminuted resin waste, may be supplied to a heated roll crusher and plastified there under the effect of heat and pressure so that such resin may then be immediately made into articles or, on the other hand, granulated. The components then supplied together may be quite different, as for example resin fragments produced by a cutting mill, plastic foil broken down into the form of flakes, or resin in powder form as well, for example for improving the quality of regenerated material.

To make certain that the plastified resin coming from the crushing rolls may be produced with an even quality it is necessary to see that the mixture of the different components is supplied to the rolls with a constant mixing ratio. For optimum operation of the rolls the component should be applied to them in the form of an evenly distributed, coherent, thin or single-thickness layer to make certain that the component is held fast by the foil coating of plastified resin on the roll and is successfully moved along into the crushing or squeezing zone. Therefore the specific problem to be solved is to supply different components with a given mixing ratio, that will vary from case to case, in the form of a relatively thin layer where processing is to take place and furthermore to see that the given mixing ratio is adhered to in the layer as well. Expressed generally, it is therefore possible to say that one aim of the present invention is to devise a method for mixing particulate mixture components with a given mixing ratio as part of a process requiring such materials such that the mixing ratio is adhered to even in the case of small amounts of the components till the components are fed into the means where such further processing takes place.

Because it is not possible to avoid separation of the components of a mixture during transport in containers and/or during temporary storage, the object of the invention is limited to improving the mixing operation as a part of a process including other operations.

In order to effect these and other objects of the invention, the components are separately metered out by means of a metering device operating at least substantially continuously and are distributed from the outlet of the metering device in a free fall onto a level, planar conveyor belt and are supplied in a further free fall from an output end of the belt into a further processing zone, the components preferably being distributed onto the conveyor belt in superposed layers.

By suitably matching the output rate of the metering units and the speed of the conveyor belt it is possible to produce a correspondingly thin layer which nevertheless keeps to the desired mixing ratio on the conveyor belt. Since the belt is moved on the level and in a planar form, there is no change in the position of the layer of component before it is discharged from the belt. Since the component passes from the discharge end of the belt to the further processing zone, it will arrive thereat with the desired mixing ratio as well Because furthermore the component is distributed onto the conveyor belt in a thin layer, it is quite a simple step to remove metallic impurities from it on its way from the metering unit to the discharge end of the conveyor belt, such impurities resulting from wear of the metering units or otherwise finding their way into the layer of material as a component in the form of waste resin as supplied.

Therefore in keeping with a further useful development of the invention, the component located on the conveyor belt is freed of metal particles by a magnetic separator.

A further aim of the invention is to devise an apparatus for performing the method.

In keeping with the invention such an apparatus comprises a conveyor belt guided on the level and in a planar form as far as a point over the further processing zone to be supplied with the mixed components, a number of metering units for particulate components placed one after the other in the direction of conveying, such units operating at least substantially continuously, so that the component discharged therefrom and falling freely arrives on the conveyor belt generally over its full width.

For undertaking the method it is desirable that the separate components be metered out as continuously as possible. This is made possible by a particularly convenient development of the invention in keeping with which there is at least one ribbed roll in the metering passage of each metering unit between a feed port and an outlet port, such roll being able to be rotated about an axis running through the said metering passage transversely, and being furnished with shallow groove-like depressions placed successively in the circumferential direction and separated from each other by helical ribs from one axial end thereof to the other.

Because of this the separate depressions only take up a relatively small amount of component, it being possible by having a suitably large number of depressions to provide for a generally continuous discharge of the material. This effect is even further enhanced because the depressions run helically. This leads to a scattering effect in the direction of the axis of the ribbed roll and the discharge of component starts for example at one end of the ribbed roll, while it terminates at the other end of the ribbed roll.

Since the mixing method of the present invention lends itself particularly well to the mixing of components that are different in nature, as for example components with a granular, powder-like, lamellar or flake-like structure, it is particularly useful if the metering units may be adapted to the material of different components or may be adapted for this by substitution.

As an example of this, in keeping with a beneficial further development of the invention, the metering unit comprises two ribbed rolls arranged to be rotated about parallel axes synchronously in opposite directions, such rolls occupying the metering passage and having ribs adapted to mesh with each other like helical gearing, the distance between the axes of the rolls and the angle between the rolls as related to the circumference being adjustable.

This makes it possible to shut off the metering passage completely so that there is not the least chance of components leaking out, this being accomplished by turning one of the two rolls in relation to the other so as to make meshing engagement with the sides of the ribs thereon, whereas for metering a granular component a space is maintained between the ribs, corresponding to the maximum grain size, in the engagement zone.

If at least a part of the components to be mixed consists of resin or plastic foil comminuted into a flake-like form, there is a danger of the foil-like components fouling the ribs and the housing delimiting the metering passage so that the component becomes heated by friction and causes a stoppage of the metering unit with the result that operation may only be resumed after the metering unit has been cleaned. It is more specially in the case of operation of crushing rolls as noted that a given mixing ratio should be adhered to as closely as possible and furthermore continuous running of the apparatus is to be ensured.

To this end a further advantageous form of the invention is such that only a single ribbed roll is placed in the metering casing and the metering passage is limited by a knife that is fixed in relation to the ribbed roll so that its knife edge is adjacent to the roll, the outer edges of the ribs running towards the knife edge being designed as cooperating cutting edges.

In the event of large pieces of foil making their way through the comminuting means when comminuting foil-like synthetic resin, such pieces will not be taken up in the shallow, trough-like depressions, if they are very large, so that they will remain within the feed opening of the metering unit and may be removed therefrom. Smaller lumps, which are not yet in the desired flake form, are taken up in the trough-like depressions and are moved as far as the cutting zone at the knife where they are comminuted so that such foil-like component is not able to jam and interfere with continuous operation with a constant mixing ratio.

Preferably there is a guide face or lining that is parallel to the axis of the ribbed roll so as to delimit a feed duct in the direction of running of the ribbed roll so as to run towards the cutting gap between the knife and the ribbed roll, such guide face being adjustable in relation to the radial plane, containing the cutting gap, in a radial direction so that the metering unit may be adapted for the processing of foil component with a small cutting gap or the processing of a more typically granular component with a larger cutting gap.

Further advantageous and convenient forms of the invention will be seen from the claims.

Using the following account a detailed explanation will be given of working examples of the invention to be seen in the drawings.

LIST OF THE VARIOUS VIEWS OF THE DRAWINGS

Figure 7:
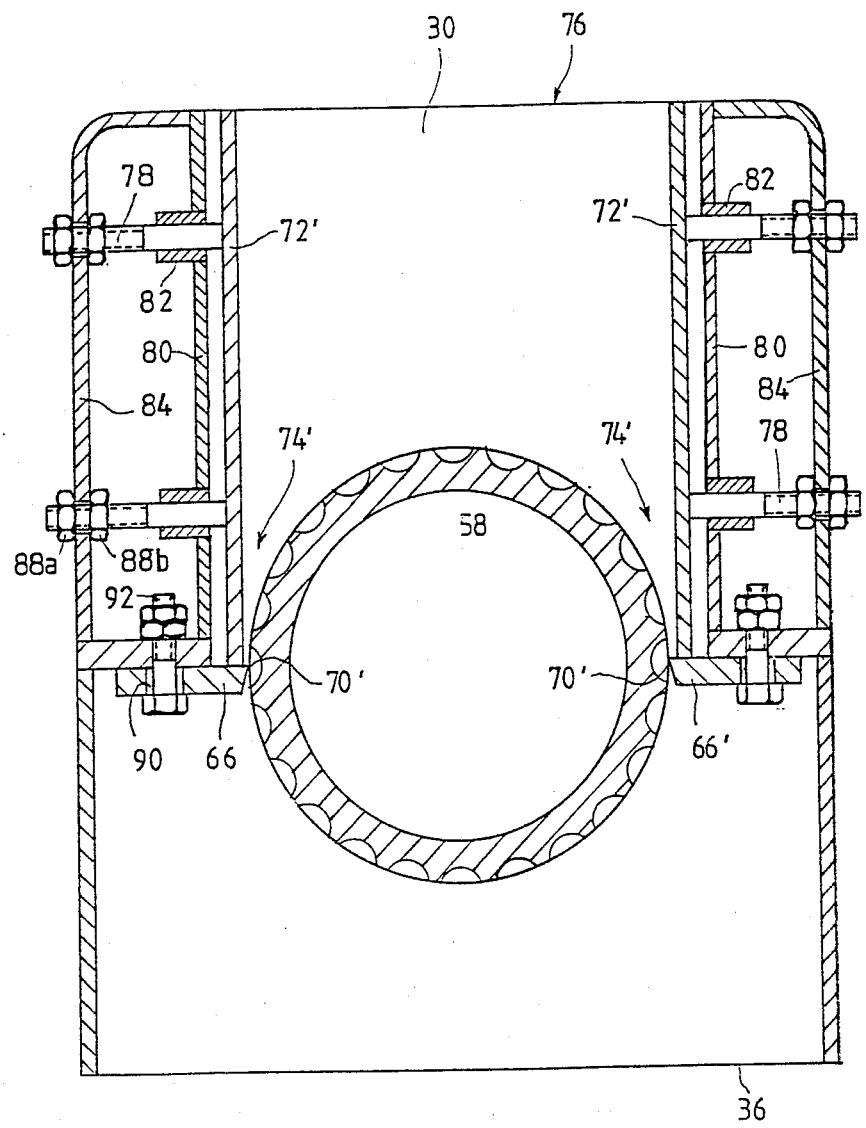
FIG. 7 is a diagrammatic section through a third embodiment of a metering unit.
Figure 8:
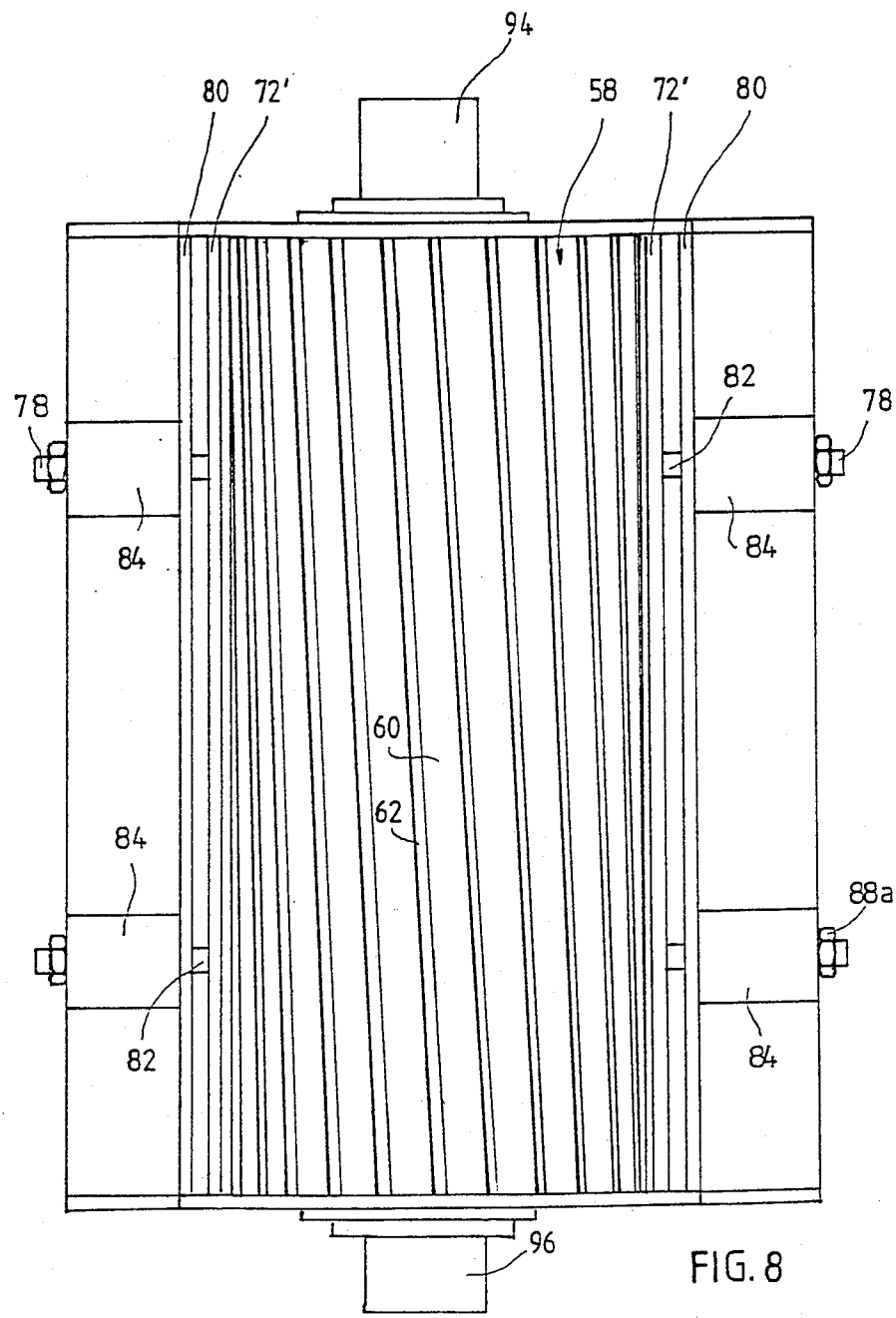

FIG. 8 diagrammatically shows the metering unit of FIG. 7 in plan view.

Figure 9:
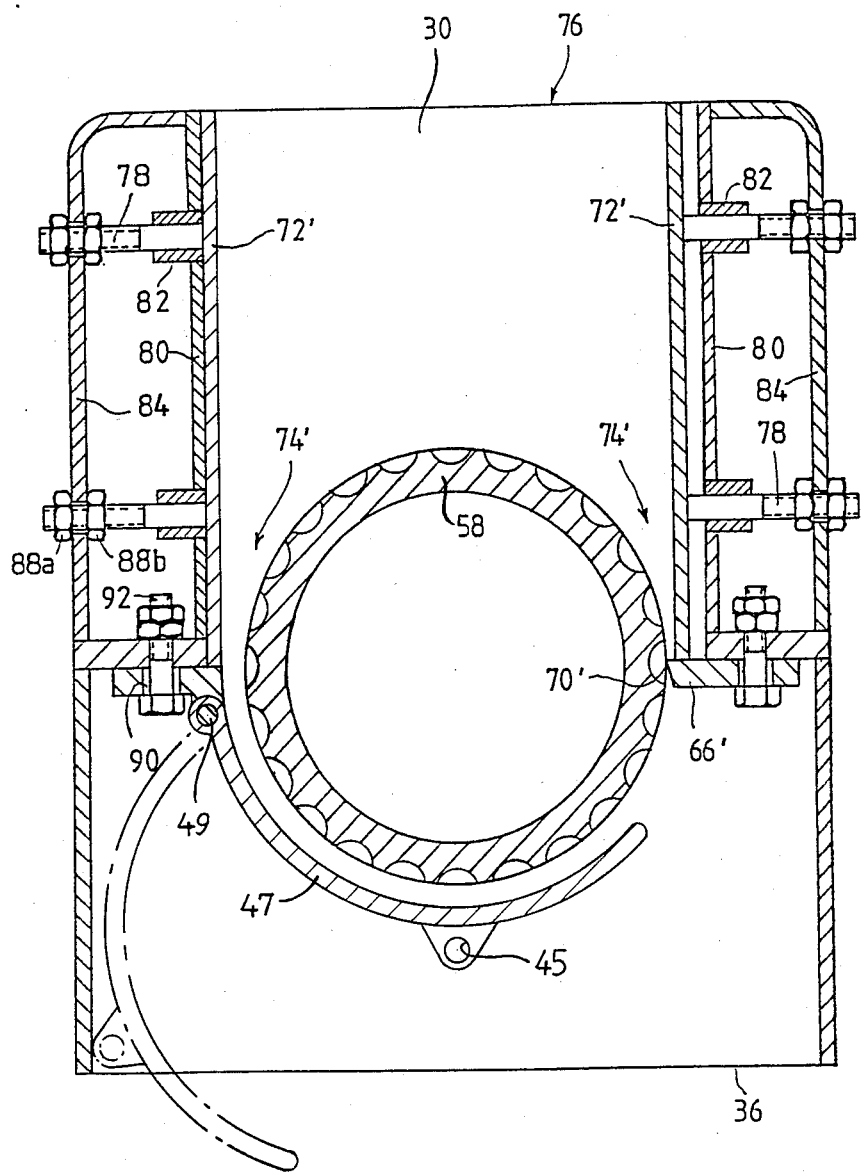

FIG. 9 is a view corresponding to that of FIG. 7 after adaptation of the apparatus.

Figure 1:
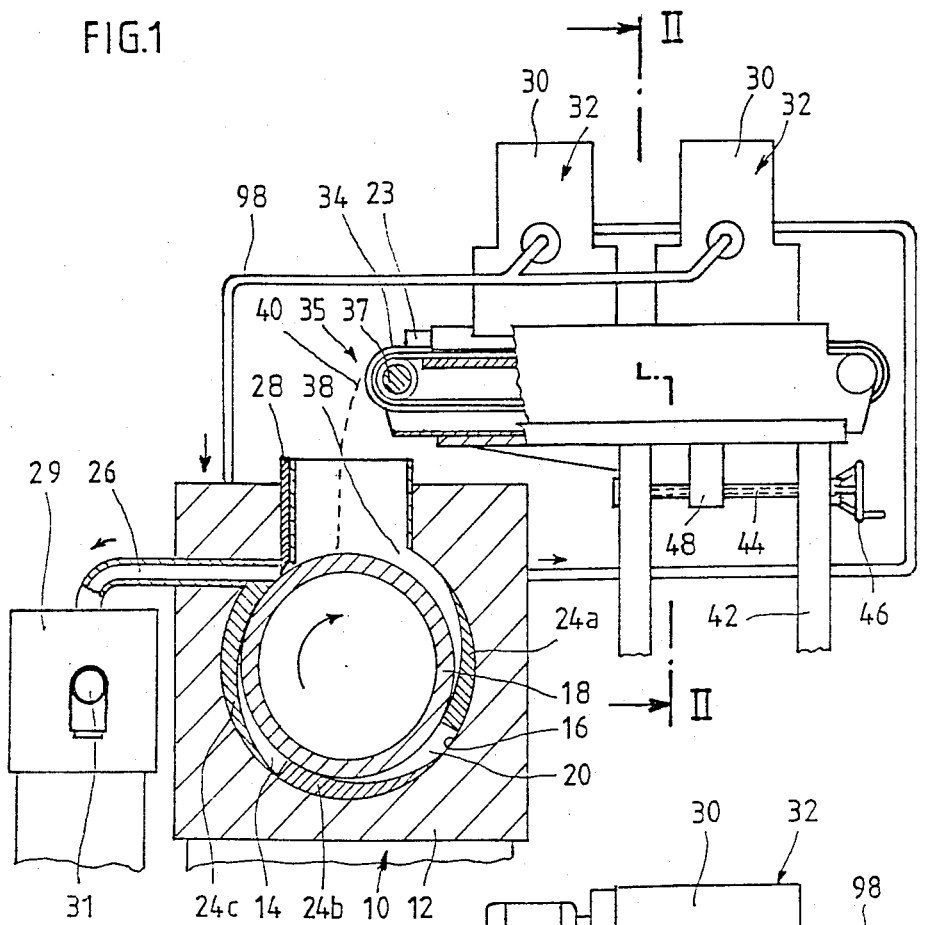
FIG. 1 is a diagrammatic and partly sectioned elevation of an apparatus for processing synthetic resin with a mixing device in keeping with the invention.
Figure 2:
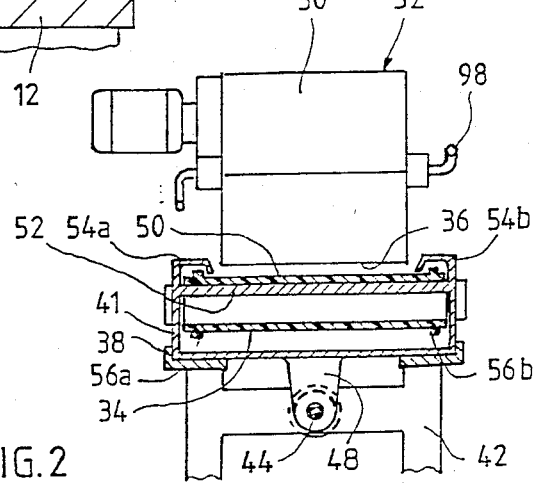
FIG. 2 is a section taken on the line II—II of FIG. 1.

FIG. 10 is a diagrammatic elevation of the end, to be seen on the left in FIG. 1, with a metal removing device used therewith.

DETAILED ACCOUNT OF EMBODIMENTS OF THE INVENTION

A mixing apparatus generally referenced 31 will now be explained in its function as a feed unit for conventional crushing rolls 10 for the processing of synthetic resin and more specially of waste synthetic resin. However it is to be noted that the mixing apparatus may be used for other purposes.

The roll crusher 10 is made up of a housing 12, in which a roll chamber 14 with a level axis is formed to receive a heated crush roll 18 mounted for rotation and with a radial clearance from the inner wall face 16 of the roll chamber 14. There is an upright feed duct 22 running down into the annular space 20 between the roll 18 and the inner face 16. This space 20 is shown out of scale to be larger than it would be in proportion. In the crusher there are three crushing segments 24, 24b and 24c in the space 20, that in each case shut off the annular space but for a narrow gap so that the resin component heated in the roll crusher 10 is at the same time subjected to a heavy crushing action action. Downstream from the last crushing segment 24 the resin component plastified by heat and pressure is forced off by a stripper 28 into an outlet duct 26.

To make certain of reliable feeding of the roll crusher and to maintain the desired quality standard it is necessary for resin component to be distributed over the full axis length of the crushing roll 18 with a constant mixing ratio as a relatively thin layer, because on the one hand there is a decrease in the driving power needed with a decrease in the thickness in the layer of component, and on the other hand there is the danger of a blockage of the component in the inlet gap 38 into the annular space 20, if the layer thickness is excessive and not all the particles of component supplied may be entrained by the sticky film covering the crushing roll. It will be clear without further explanation that fluctuations in the mixing ratio will lead to a reduction in quality.

In order to be able to supply the roll crusher with the thinnest possible layer of resin components at a given but nevertheless adjustable mixing ratio, the plant is equipped with the mixing apparatus 31, the present example of the invention, for simplification, being limited to the mixing of only two components or starting materials so that accordingly there are only two metering units 32 for such two components. If a greater number of different components are to be mixed, then there will be a number of metering units 32 corresponding to the number of components, without however modifying the general teaching as presented in the example shown.

The components are each placed in one such feed duct 22 forming part of one of the metering units 32. The metering units 32 are placed vertically over and successively in the direction of conveyance of a level conveyor belt 34 that is run in a planar or flat condition and whose discharge end 35 is located over the feed duct 22 of the roll crusher 10. The breadth of the ports 36 for the feed of components of the metering unit 32, the breadth of the conveyor belt 34 and the breadth of the feed duct 22 are so sized that the component coming out of the feed ports and being deposited on the conveyor belt 34 is in the form of a thin layer and is distributed or scattered over the full axial length of the crushing roll 18 on same in which said component forms a film of plastified, sticky resin coating the crushing roll 18 and being entrained thereby.

Each of the metering units 32 produces a thin component layer on the conveyor belt 34 whose thickness depends on the one hand, as will be later explained, on the speed of operation of the metering unit 32 and on the other hand on the speed of travel of the conveyor belt 34. Dependent on the number of metering units 32 placed successively in the direction of conveying of the conveying belt 34 a number of layers of component are placed on the belt one on top of the other before the end of the belt is reached, the thickness of the layers being controlled by a suitable adjustment of the metering units and being able to be set to a preset mixing ratio, whereas the absolute layer thickness may be adjusted by modifying the speed of the belt 34 while keeping the mixing ratio unchanged.

To make certain that despite a modification of the belt speed the component moving down in the trajectory 40 at the discharge end of the belt falls onto the further processing zone, that is to say in the present case, the crushing roll 18, as desired, the discharge end may be adjusted by moving it in the direction of conveying. For this purpose the conveying belt 34 is mounted in a frame 41 that may be changed in position along a guide 38. There is a driving screw 44 mounted in a base 42 carrying the guide 38, the screw 44 having a handwheel 46 and running through a lead nut 48 fixed on the frame 41 so that if the handwheel 46 is turned the position of the frame 41 and therefore of the discharge end 35 of the conveyor belt 34 may be adjusted.

In order to keep up an even distribution of the component coming out of the metering units 32 on the conveying belt 34 as far as the end of the conveying belt 34, the conveying belt 34 is placed on the level and furthermore its top run 50, that undertakes the conveying function as such, is carried on a support plate 52, that furthermore keeps the upper run 50 flat in a direction normal to the direction of motion so that there will be no danger of the component layer becoming thicker towards the middle of the belt or at its edges as might be the case if the belt were to take on a camber in the transverse direction. Since the belt is to be covered with component generally right over the full width thereof, lateral baffles 54a and 54b are present, that bridge the gap between the lower end of the metering units 32 and the conveyor belt 34 and overlap lateral ribs 56a and 56b placed near the side edges of the conveyor belt 34, and keep component coming from the metering units 32 from falling off the side of the belt 34.

Figure 3:
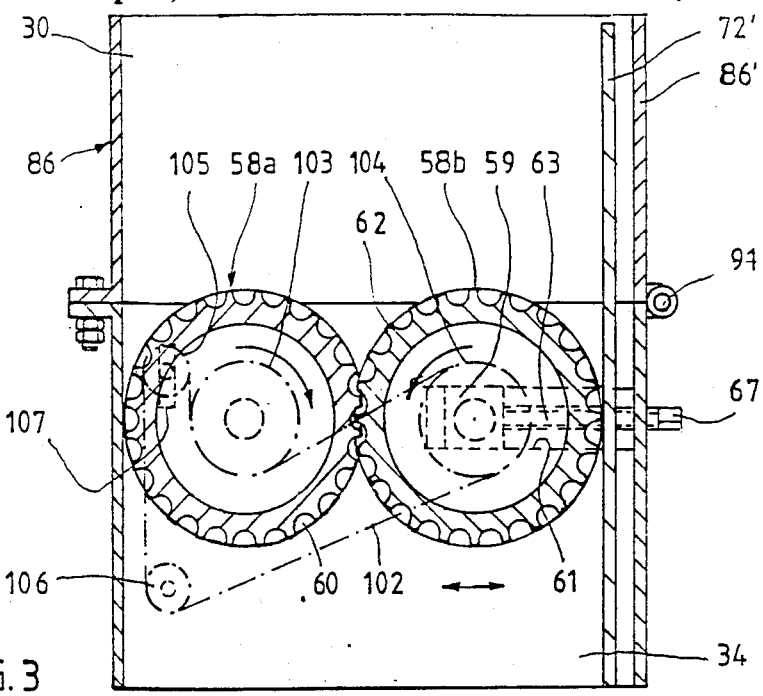
FIG. 3 is a diagrammatic section of a metering unit for the mixing device.
Figure 4:
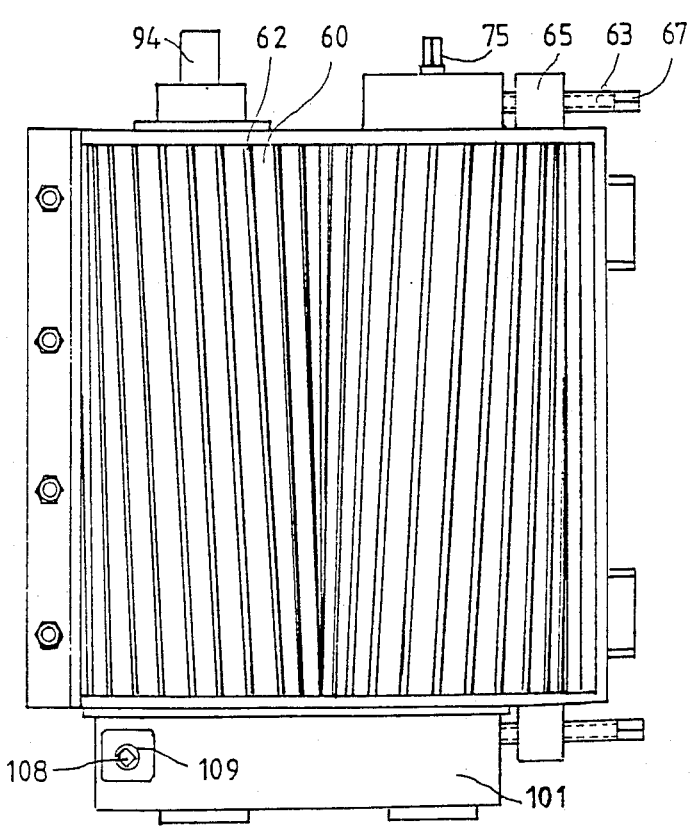
FIG. 4 is a plan view of the metering unit as seen in FIG. 3.
Figure 5:
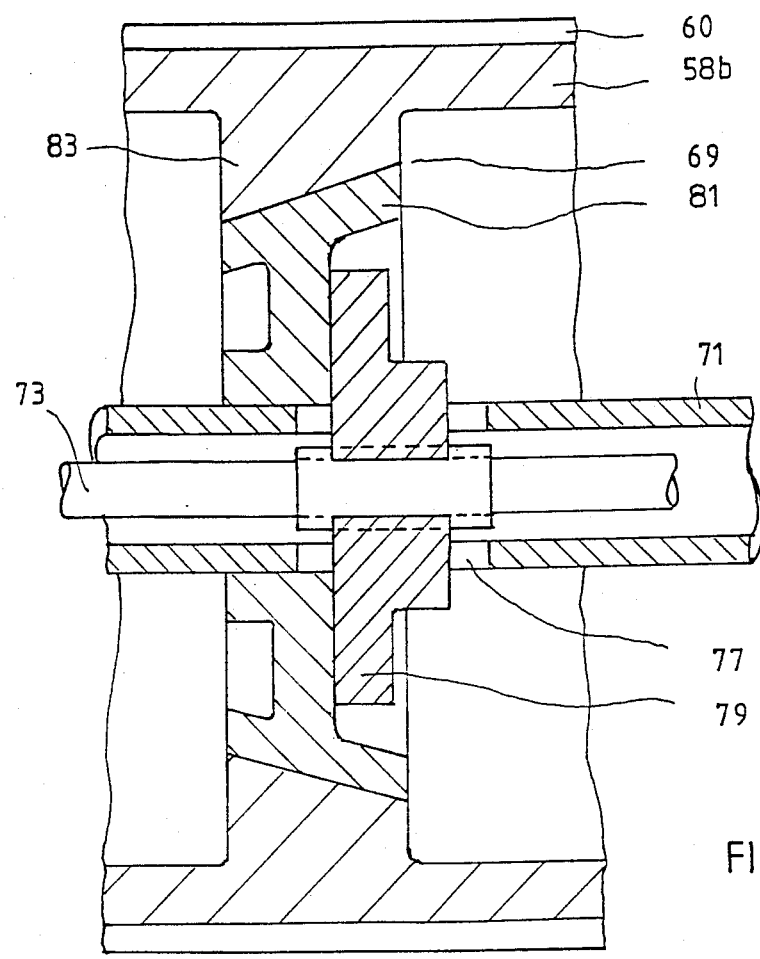
FIG. 5 is a diagrammatic section taken through a clutch device located in a ribbed roll forming part of the metering unit.

It is not possible to use conventional metering units to meter out different sorts of component, as for example those of a granular or powdery nature, or flake-like components as produced by comminuting waste foil, as may be required, and to ensure the flow of the component in an at least approximately continuous current as is more specially important for performing the method of the invention, to the conveyor belt 34, such current not being excessively dense. With reference to FIGS. 3 to 5 a metering unit will be described, that is on the one hand suitable for the mixing method as explained and for metering out granular or powder-like components.

Between the feed duct 30 and the discharge port 36 a generally rectangular housing 86 delimits a metering passage containing two parallel ribbed rolls 58a and 58b that are driven at the same speed in oposite directions. The roll 58a to be seen on the left has a fixed axis of rotation in the housing 86 while the roll 58b on the right is mounted in bearings 59 able to be shifted in level guides 61 in the housing 86. Such adjustment is undertaken by way of driving screws 63 that are turningly joined to the bearings 59 but may not be moved in an axial direction, such screws fitting into lead nuts 65 mounted on the housing 86 while the free ends of the screws are for example made square at 67 so that a crank key may be used therewith.

The ribbed rolls 58a and 58b are furnished with a number of relatively shallow, rounded depressions 60 separated by ribs 62 that together with the depressions are helically placed in relation to the axis of the roll 58a or 58b. The ribs 62 of the two rolls 58a and 58b are arranged to mesh with each other like the teeth of helical gearing. The flanks of the ribs 62 are so formed that, provided the spacing and relative angle of the two rolls 58a and 58b is correct, the ribs engage like the teeth of gears with rib-to-rib, rolling contact.

To make such an adjustment of the two ribbed rolls 58a and 58b it is not only necessary to shift the ribbed roll 58b in a horizontal direction using the screws 63 but furthermore to shift the roll 58b in the circumferential direction in relation to its shaft. As will be seen from the diagrammatic view of FIG. 5 in accordance with one possible form of the invention the ribbed roll 58b is joined with its shaft 71 by a conical clutch 69. The shaft 71 is hollow and contains a screw-threaded setting rod 73 that has a square outwardly protruding end 75 on which a crank may be fitted. At the clutch the shaft 71 has a slot with a dog 79 running therethrough to the outside. Inside the shaft 71 the dog 79 has a threaded hole receiving the setting rod 73. The dog 79 cooperates with a gripping cone 81 which is able to be shifted in an axial direction and as part of the conical clutch cooperates with a cone 83 joined to the ribbed roll 58b.

If the threaded rod 73 is turned so that the dog 79 (which may not be turned in relation to the shaft) is moved to the right in terms of FIG. 5, the conical clutch will be disconnected, possibly with the aid of a spring that is not shown, so that the ribbed roll 58b may be turned in relation to the shaft 71. Afterwards the setting screw 73 is turned back in the opposite direction and the dog 79 will clamp the two parts 81 and 83 of the conical clutch firmly together so the ribbed roll 58b is keyed on the shaft 71 again.

If desired it is possible to have a clutch at both ends of the ribbed roll 58b, in which case the setting rod 73 will have to extend along a greater length of the shaft 71.

In a drive box 101 located on one end face of the housing 86 there is a chain for driving the two ribbed rolls 58a and 58b at the same speed in opposite directions. Each of the two ribbed rolls 58a and 58b has its own sprocket wheel 103 and 104 and the drive chain 102 crosses the plane containing the axes of the two ribbed rolls 58a and 58b so that the sprocket wheels 103 and 104 are driven in opposite directions. The driving chain 102 is trained over two idler wheels 105 and 106, of which the one 105 is able to be adjusted, as is diagrammatically indicated by the guide 107 and a screw setting rod 109 (see FIG. 4) having a square end 108. It will therefore be seen that changes may be made in the spacing between the axes of the ribbed rolls 58a and 58b for compensatory adjustment, whereas on the other hand it is possible for the direction of turning of the ribbed rolls 58a and 58b to be reversed as for example for cleaning.

To improve access to the ribbed rolls 58a and 58b for the removal of any component fouling them and generally to facilitate cleaning, the upper housing part 86' may be folded upwards about a hinge 91.

The drive of the ribbed rolls 58a and 58b is for example by way of the stub shaft 94.

In a state of adjustment that is suitable for metering out granules or small resin particles, as for example from a cutting mill, the relative angle between the two rolls is so chosen the in the meshing zone of the two rolls the rib 62 of the one roll projects exactly into the middle of the depression 60 opposite to it in the other roll, the flanks of the ribs 62 not being in contact and in fact there is a gap corresponding to the maximum allowable size of particle between them. In this respect the distance between the axes of the two rolls 58a and 58b is so set that the limit of the rib running in the circumferential direction of the one roll keeps to a corresponding distance from the floor of the depression 60 in the other roll.

If particles exceeding the maximum size find their way into the zone of engagement of the ribs they will be crushed down to such size by the force of the rolls 58a and 58b.

By making a suitable change in the angular setting and the spacing between the axes the apparatus may be set for different sizes of particles if desired.

In order to meter out powder components as well, the two ribbed rolls are best so set that the flanks of the ribs 62 engage each other gearingly with rolling contact to keep such powder from freely flowing through gaps between the ribs without full control.

By moving the rolls 58a and 58b closer together for metering powder components a gap would normally be formed between the part of the roll 58b and the inner face 86 of the housing, through which the component would then be able to flow, even although such flow would be limited by the upward motion of the face of the ribbed roll 58b at this position. It is therefore best if the housing is fitted with an inner wall lining 72' here joined to the bearings 59 and able to be adjusted together with them and the ribbed roll 58b. The lining is then placed closely adjacent to the periphery of the ribbed roll 58b.

For metering flake component as for example that produced by comminuting plastic or synthetic resin foil or for material resin that may contain foil-like fractions, the forms of the metering unit to be seen in FIGS. 6 to 10 are more specially suitable. These metering units each have only one single ribbed roll 58 of the sort noted hereinbefore, that is furnished with relatively shallow depressions 60 which in cross section will be seen to be rounded in order to reduce adhesion of component.

The ribs 62 between the depressions 60 cooperate with a knife 66, that is mounted on the inner wall face of the chamber containing the ribbed roll, the cooperation being such that the leading edges 68 of the ribs 62 cut the component against the cutting edge 70, running parallel to the axis of the ribbed roll 58. In order to produce an efficient drawing cut, the depressions 60 and the ribs 62 are oblique in this case as well in relation to the axis of the ribbed roll 58 and preferably in such a way that at one axial end of the ribbed roll 58 the leading edge of one rib 62 ceases to make shearing contact with the cutting knife 70 just when at the other end of the roll 58 the leading edge 68' of the following rib 62' starts to make shearing engagement with the cutting knife 70.

The inner wall lining 72 forming the limit of the feed duct 30 in the direction of motion of the ribbed roll 58 is straight as far as a point adjacent to the knife 70 so that a wedge-like or tapering intake gap 74 forms, through which the component is supplied to the cutting zone and the metering rib depressions. In the event of the component jamming in the cutting zone the direction of rotation of the ribbed roll 58 is reversed. Since the arrangement is symmetrical, that is to say there is a knife 66 or 66' for each direction of turning, such a reversal is possible at any time. In order to make certain that the metering unit will operate continuously it is furthermore possible for there to be means monitoring the torque at the ribbed roll shaft and automatically reversing the direction of rotation as soon as the torque exceeds a given threshold.

This arrangement is well adapted to the supply of foil-like components inasfar as such foils are drawn into the feed duct 74 and because of the closeness together of the ribs 60 and furthermore because of the small volume of the depressions 60 such components will leave the metering unit 32a in all cases in the form of a relatively thin descending curtain of flake-like particles, even if the material supplied to the feed duct 30 is in the form of coarse pieces of foil.

Figure 6:
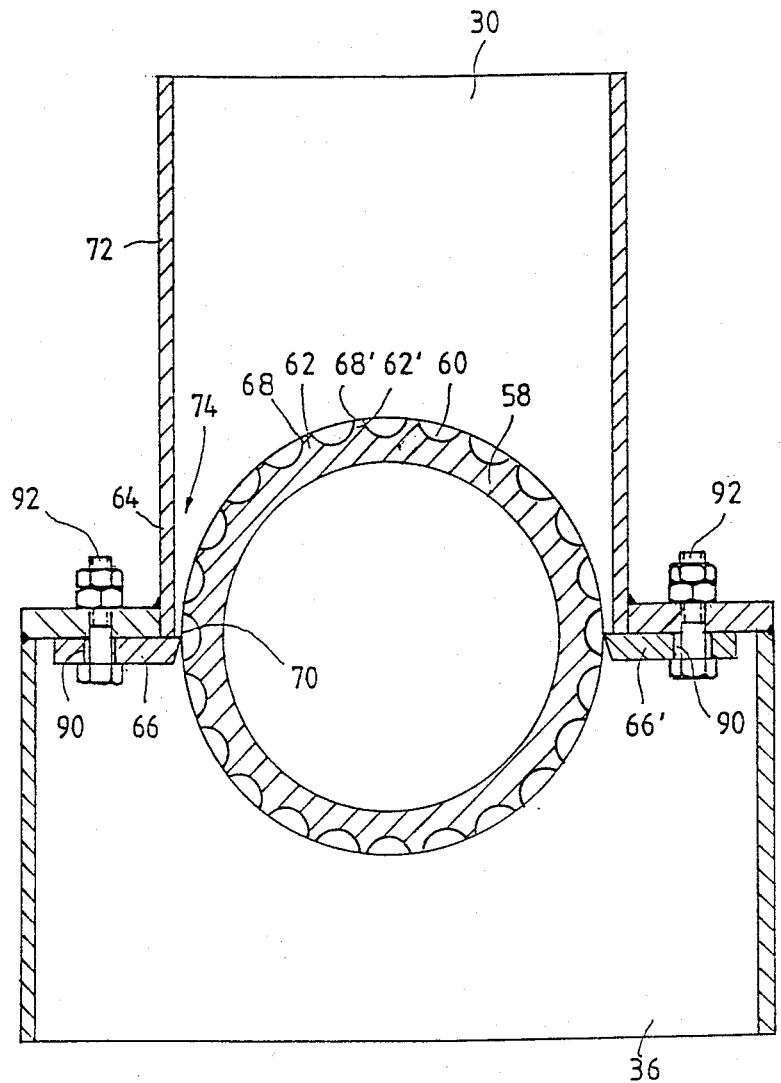
FIG. 6 is a diagrammatic section through a second working example of a metering unit.

In order to make it possible to use a metering unit of this type for other foil-like or other fine-grained components, the metering unit 32b in the design of FIGS. 7 and 8 is such that access to the cutting zone is adjustable, because in addition to the structure to be seen in FIG. 6 the inner lining 72' leading to the draw in gap 74' is able to be adjusted radially in the diametral plane running through the knife cutting edges 70', the range of such adjustment being indicated more or less diagrammatically by four screws 78 joined with each inner lining 72', such screws being guided parallel to each other by respective fixed outer wall elements 80 forming the housing of the unit. Such screws are furthermore taken through pairs of outer straps 84, that are spaced from the wall elements 80 and are joined to the housing generally referenced 86 of the metering unit 32b. The screws run through sleeves fixed to the elements 80 for parallel guidance and they run through holes in the upright pairs of straps 84. Such straps are spaced from the wall elements 80 and are joined to the housing, generally referenced 86 of the metering unit 32. Nuts on the screws 78 are placed on each side of each strap 84, such nuts making it possible to adjust the screws and for this reason the wall linings 72' therein in a direction parallel to the diametral plane running through the knives 70' and to lock such linings in position after such adjustment. The distance of the inner faces of the linings 72' from the knives 70' will be so set taking into account the maximum particle size that only parts are able to make their way into the cutting zone which may be comminuted down to the maximum particle size.

In the case of the two last-described forms 32a and 32b of the metering unit the knives 66 and 66' respectively are made with slots 90 and may be adjusted using fixing screws 92.

If on the one hand foil-like material and on the other hand relatively hard granular material is to be metered the form of the invention of FIG. 9 may be employed with advantage. In fact there is a danger of excessively hard material causing an unacceptably high rate of wear of the knives 66 and 66' designed for the comminution of foils. If on the other hand one were to remove the knife 66 or 66' placed in the direction of turning of the ribbed roll 58 (viz. the left hand knife in the case of counterclockwise rotation), the granular material would be able to run uncontrolledly through the gap then left open. Therefore in FIG. 9 the knife 66 has been removed and replaced by a guide shroud 47 that is secured in place so as to be concentric in relation to the periphery of the roll. The lining 72' fixing the size of inlet into the gap between the ribbed roll 58 and the guide shroud 47 is correspondingly set back towards the outer wall element 80 in order to widen the inlet gap. The guide shroud 47 is continued past the lowest point of the ribbed roll 58 to keep the particles working their way inbetween the ribbed roll 58 and the guide shroud 47 from immediately falling out downwards under the effect of gravity, something that would impair the metering efficiency. In fact, the particles are lifted up by the ribbed roll as far as the end (on the right) of the guide shroud 47, from which position they then fall through the discharge port of the metering unit 32c.

By reversing the direction of turning of the ribbed roll 58 it becomes possible to use this metering unit 32c with the described adaption for metering foil-like or granular component as may be desired.

To ensure that when operating with the knife 66' the foil flakes do not pass onto the guide shroud 47 of the metering unit 32c, because they might then possibly be entrained by the ribbed roll 58 somewhat past the cutting edge 70', the guide shroud 47 may be rocked about a shaft 49 running parallel to the axis of the ribbed roll 58 in the cutting zone so that the shroud 47 is able to be moved out of the position under the ribbed roll 58 into a resting position, that is marked in FIG. 9 with a broken line. It may be locked in this position by a bolt fitting into a hole 45 for example. The same type of locking system may be utilized for the working position as well.

For processing waste resin attempts have admittedly been made in the past to remove pieces of metal, for example by using metal detectors and/or magnetically operating metal removing means, more specially for removing steel parts or particles which might otherwise make expensive repairs to plant necessary. However in practice experience has show that it is nevertheless possible of pieces of metal to make their way into comminuting machines as for example cutting mills, such pieces of metal occurring with particles resulting from wear, as for example fractured parts of cutting members, may be found in the particulate material that is to be fed into roller presses. In order to avoid expensive repairs and to improve the quality of the resin products made, these particles are to be removed from the material to be processed before it reaches the roller press, the formation of a thin layer of material on the conveyor belt offering a particularly good opportunity for doing this, because the distance between a magnet and any metal particles to be removed may be made very small and the resistance of the non-metallic pieces of material to removal of the pieces of metal is very small because of the thinness of the layer.

Therefore for example, see FIG. 10, a diagrammatically shown device 23 for magnetically removing metals is placed across the full width of the conveyor belt 34 between the metering units 32 and the discharge end 35 of the conveyor belt 34. The distance between the device 23 and the conveyor belt 34 may preferably be adjusted in a vertical direction. The device may for example be a magnetic bar with a cleaning device or a belt crossing the conveyor belt 34, that is either itself magnetic or runs on the side, facing the conveyor belt 34, of a magnet and has a stripper placed clear of the conveyor belt. For example, the cleaning belt may be fitted with permanent magnets.

The magnetic bar may be in the form of a beam fitted with electro-magnets and which is able to be turned about an axis running transversely in relation to the direction of motion of the conveyor belt 34 so that alternately one of at least two faces, that are at different angles, may be moved into an operating position in relation to the conveyor belt 34, the other face or faces then being cleaned.

In accordance with a further possible form of the invention, the bend roll 36 at the discharge end 35 of the conveyor belt 34 is fitted with magnets so that it has the effect of a metal removing device retaining pieces of metal on the conveyor belt while the non-magnetic ones are discharged therefrom. To make for a better separation between the non-magnetic resin particles and the separated pieces or particles of metal, it is possible to have a further plate 39 fitted with magnets next to the bend roll 37 under the lower run 51 of the conveyor belt 34. Using a stripper 45' and a guide board 43 it is then possible to clear separated metallic objects out of the way.

As a further form of the invention it is possible for the conveyor belt 34 itself to have embedded permanent magnets in it, in which case however the pieces of metal will be also moved around the bend roll 37 and will be detached by the stripper 45' from the conveyor belt 34, whereas the resin particles will be thrown off at the discharge end 35.

For efficient removal of metal the belt speed should be such that the layer is as thin as possible and in the case of material with a granular structure the grains do not rest on top of each other so that they do not oppose the magnetic removal of material.

The ribbed rolls 58, 58a and 58b are made hollow so that it is possible in a conventional way (which does not need any detailed explanation here) for connections to be made for the supply and removal of heating fluid through the stub shafts running out from the two sides of the housing 86, as for example at 94 and 96 in FIG. 8. In many cases, as for example in connection with processing resin in a roller press heated coolant is available which may be used to preheat the material to be metered out.1 In connection with the plastification of resin this may on balance lead to a reduction in the total amount of energy needed.

I claim:

1. A method of mixing particulate materials with a given mixing ratio, said method forming part of a process requiring said materials, comprising the steps of:
    providing particulate materials to at least two metering units,
    metering said materials separately each in said respective metering unit, said metering unit operating at least substantially continuously,
    crushing said particulate materials in said metering units,
    distributing said materials by free fall onto a horizontal conveyor belt with a planar surface with a distribution of said materials over said belt,
    matching the distribution rate of said materials with the speed of said conveyor belt such that said given desired mixing ratio is obtained, and
    supplying said materials in a further free fall to a further processing zone as part of said process.

2. The method as claimed in claim 1 wherein said materials are distributed in superposed layers on said conveyor belt.

3. The method as claimed in claim 1 comprising the step of subjecting said materials on said belt to a magnetic field for the removal of pieces of metal therefrom.

4. An apparatus for mixing at least two particulate materials together with a given mixing ratio as part of a process plant requiring such materials in operation, said apparatus comprising a level, planar conveyor belt running to a processing zone within said plant, at least two metering units placed one after the other in succession in the direction of conveyance of said belt, each of said metering units including means defining a metering passage for flow of said particulate materials therethrough, said passage stretching from an inlet port to an outlet port, means for crushing said particulate materials positioned in said passage in each of said metering units, said units being adapted to meter said particulate materials at least substantially continuously, said outlets adapted to discharge said materials in a free fall onto said belt with a distribution onto substantially the full width of said belt, and means for adjusting the flow rate of said particulate material and the speed of said running conveyor belt such that said given mixing ratio of said particulate material is obtained.

5. The apparatus as claimed in claim 4 wherein said crushing means comprises a rotary ribbed roll placed in said metering passage for rotation about an axis running through said passage transversely thereof, said roll having ribs thereon bordering shallow trough-like depressions therebetween, said ribs being helical with respect to said axis and running from end to end of said roll.

6. The apparatus as claimed in claim 4 comprising one such ribbed roll located in each said passage, a stationary knife placed for cooperating with said ribs in defining a restricted gap as part of said passage, leading edges of said ribs being in the form of cutting edges for shearing said materials against said knife.

7. The apparatus as claimed in claim 6 comprising two such knives in said passage on two sides of the ribbed roll.

8. The apparatus as claimed in claim 6 wherein each unit comprises means defining an inlet duct for one of said particulate materials, a lining in said duct, said lining being parallel to said axis of said roll and being directed towards said gap and means for adjusting said lining in a direction that is radial in relation to a radial plane of the roll containing the gap.

9. The apparatus as claimed in claim 7 wherein said knives are detachably secured in place, at least one of said units having a shroud to take the place of one such knife and extending at least substantially concentrically about part of an outer face of the roll in said unit and past a lowest point of such outer face.

10. The apparatus as claimed in claim 9 comprising near a point of attachment of said shroud means supporting said shroud so that same may be rocked about a further axis parallel to said axis between an active position in which said shroud is parallel to said outer face and an inactive position and means for locking said shroud in both of said positions.

11. The apparatus as claimed in claim 5 wherein each metering unit comprises two such ribbed rolls in parallelism, means for driving said rolls in opposite directions at the same speed as each other with rib-to-rib rolling contact in the manner of meshing gears, and means for adjusting the distance between the axis of said rolls in each said unit and for turningly setting one roll in relation to the other.

12. The apparatus as claimed in claim 5 wherein said ribs on said rolls have such a helical angle about the axis of said roll that ends of each rib are spaced apart from each other in a circumferential direction by a distance equal to the circumferential pitch of the ribs.

13. The apparatus as claimed in claim 5 wherein said ribs have a rounded cross section.

14. An apparatus for mixing at least two particulate materials together with a given mixing ratio as part of a process plant requiring such materials in operation, said apparatus comprising: a level, planar conveyor belt running to a processing zone within said plant, at least two metering units placed one after the other in succession in the direction of conveyance of said belt, each metering unit has means defining a metering passage for flow of one of said particulate materials therethrough, said passage stretching from an inlet port to an outlet port, each said metering passage is vertical for supply of material to said roll and discharge of material therefrom, said passage having angular wall faces with respect to the vertical, a rotary ribbed roll placed in said metering passage for rotation about an axis running through said passage transversely thereof, said roll having ribs thereon bordering shallow trough-like depressions therebetween, said ribs being helical with respect to said axis and running from end to end of said roll, units being adapted to meter said particulate materials at least substantially continuously, and said metering units having outlets adapted to discharge said materials in a free fall onto said belt with a distribution onto substantially the full width of said belt.

15. The apparatus as claimed in claim 14 wherein said wall faces depart from the vertical from below.

16. The apparatus as claimed in claim 11 comprising means for changing the distance between the axes of the rolls, this said means being adapted to move one of said rolls together with a part of the means defining said passage tangent to said roll.

17. The apparatus as claimed in claim 5 wherein each unit comprises a housing defining a supply zone over its roll, said housing having a section able to be removed.

18. The apparatus as claimed in claim 5 wherein each unit comprises a housing defining a supply zone over its roll, said housing having a section able to be rocked out of place.

19. The apparatus as claimed in claim 5 wherein at least one of said rolls is hollow and is fitted with duct connection means for the supply and removal of heating fluid thereto and therefrom.

20. The apparatus as claimed in claim 4 wherein said conveyor belt has a discharge end that is adjustable in the direction of conveying of said belt.

21. The apparatus as claimed in claim 20 comprising a frame in which said conveyor belt is mounted, said frame being able to be adjusted in the direction of conveying.

22. The apparatus as claimed in claim 4 comprising a magnetic metal removing means placed between said units and a discharge end of said conveyor belt and running across said belt.

23. The apparatus as claimed in claim 4 wherein said conveyor belt is fitted with magnets and with a stripper means placed downstream from a discharge end of said belt.

* * * * *